US008788116B2

(12) United States Patent
Litz

(10) Patent No.: US 8,788,116 B2
(45) Date of Patent: Jul. 22, 2014

(54) AUTOPILOT SYSTEM FOR USE IN A WIND TUNNEL

(75) Inventor: Bradley C. Litz, Chaska, MN (US)

(73) Assignee: MTS Systems Corporation, Eden Prairie, MN (US)

(*) Notice: Subject to any disclaimer, the term of this patent is extended or adjusted under 35 U.S.C. 154(b) by 1122 days.

(21) Appl. No.: 12/558,972

(22) Filed: Sep. 14, 2009

(65) Prior Publication Data

US 2010/0070126 A1     Mar. 18, 2010

Related U.S. Application Data

(60) Provisional application No. 61/096,539, filed on Sep. 12, 2008.

(51) Int. Cl.
*G05D 1/00*     (2006.01)
*G01M 15/00*     (2006.01)

(52) U.S. Cl.
USPC ............................ 701/2; 73/116.01; 73/116.07

(58) Field of Classification Search
USPC ........................... 701/31.4; 73/116.01–116.08
See application file for complete search history.

(56) References Cited

U.S. PATENT DOCUMENTS

| | | | | |
|---|---|---|---|---|
| 4,214,381 A | * | 7/1980 | Clark et al. | 434/67 |
| 4,442,708 A | * | 4/1984 | Gable et al. | 73/118.01 |
| 4,862,737 A | * | 9/1989 | Langer | 73/116.07 |
| 4,953,391 A | * | 9/1990 | Schober et al. | 73/116.07 |
| 5,111,685 A | * | 5/1992 | Langer | 73/118.01 |
| 5,338,206 A | | 8/1994 | Hupfer | |
| 5,756,889 A | * | 5/1998 | D'Angelo | 73/116.08 |
| 6,209,209 B1 | * | 4/2001 | Linson et al. | 33/203.12 |
| 6,588,287 B2 | * | 7/2003 | Gleason et al. | 73/865.6 |
| 7,360,443 B2 | * | 4/2008 | Kerschbaum et al. | 73/856 |
| 7,614,291 B2 | * | 11/2009 | Ebeling et al. | 73/116.07 |
| 7,788,984 B2 | * | 9/2010 | Meyer et al. | 73/862.041 |
| 7,841,233 B2 | * | 11/2010 | Cogotti | 73/147 |
| 8,272,258 B2 | * | 9/2012 | Estrada | 73/116.01 |
| 2002/0040533 A1 | * | 4/2002 | Jahn et al. | 33/645 |
| 2002/0152799 A1 | * | 10/2002 | Gleason | 73/37 |

(Continued)

FOREIGN PATENT DOCUMENTS

DE     3641424     6/1988
DE     20105929    8/2001

(Continued)

OTHER PUBLICATIONS

Written Opinion of the European Patent Office in counterpart foreign application No. PCT/US2009/056800 filed Sep. 14, 2009.

(Continued)

*Primary Examiner* — Thomas Black
*Assistant Examiner* — Tyler Paige
(74) *Attorney, Agent, or Firm* — Steven M. Koehler; Westman, Champlin & Koehler, P.A.

(57) ABSTRACT

A roadway system for a vehicle and a method for testing a vehicle on a roadway system are provided. The roadway system and/or method include a platform having at least one movable endless belt configured to support a vehicle. A sensor assembly is configured to provide an output signal indicative of position, displacement, velocity and/or acceleration of the vehicle on the belt with respect to at least one reference axis. An autopilot system is configured to operate a component of the vehicle to control the vehicle on the belt with respect to the reference axis based on the output signal.

33 Claims, 5 Drawing Sheets

(56) References Cited

U.S. PATENT DOCUMENTS

| | | | |
|---|---|---|---|
| 2005/0028584 A1* | 2/2005 | Barnes et al. | 73/117.1 |
| 2006/0237237 A1* | 10/2006 | Kerschbaum et al. | 177/145 |
| 2008/0202227 A1* | 8/2008 | Ebeling et al. | 73/116.01 |
| 2010/0070126 A1* | 3/2010 | Litz | 701/29 |
| 2010/0292897 A1* | 11/2010 | Hub | 701/41 |

FOREIGN PATENT DOCUMENTS

| | | | | |
|---|---|---|---|---|
| DE | 102004003099 | | 8/2005 | |
| EP | 2078924 | | 7/2009 | |
| JP | 2133649 | | 11/1990 | |
| JP | 223700 | | 8/1993 | |
| JP | 2001324409 | | 11/2001 | |
| JP | 2001324409 A | * | 11/2001 | G01M 9/04 |
| JP | 2003194665 | | 7/2003 | |
| JP | 2003194665 A | * | 7/2003 | G01M 9/04 |
| JP | 2005257691 | | 9/2005 | |
| JP | 2008175564 | | 7/2008 | |
| JP | 2008175564 A | * | 7/2008 | |
| JP | 2008202963 A | * | 9/2008 | |
| JP | 2008202963 | | 9/2009 | |
| WO | WO 97/35172 | | 9/1997 | |
| WO | WO 00/60308 | | 10/2000 | |

OTHER PUBLICATIONS

Official Search Report of the European Patent Office in counterpart foreign application No. PCT/US2009/056800 filed Sep. 14, 2009.
Notice of Reasons for Rejection for corresponding Japanese Application No. 2011-527018 filed Sep. 14, 2009, dated Sep. 13, 2013.

* cited by examiner

AUTOPILOT SYSTEM FOR USE IN A WIND TUNNEL

CROSS-REFERENCE TO RELATED APPLICATION

This application claims the benefit of U.S. Provisional Application entitled "AUTOPILOT system FOR USE IN A WIND TUNNEL" having Ser. No. 61/096,539, and filed Sep. 12, 2008, the content of which is incorporated herein by reference in its entirety.

BACKGROUND

The discussion below is merely provided for general background information and is not intended to be used as an aid in determining the scope of the claimed subject matter.

Aspects of the present invention relate to equipment and methods used during laboratory testing of bodies moving over surfaces such as all types of vehicles traveling on a roadway.

Referring to vehicles such as automobiles by way of example, the use of simulated roadways has become important in the development of vehicle designs. These roadway simulators generally comprise one or more individual endless belts that are mounted below the vehicle, engaging one or more wheels, and/or positioned below other body panels of the vehicle. The belts are driven to simulate driving the vehicle over a road. Commonly, the roadway simulators are disposed in wind tunnels so as to measure aerodynamic characteristics. Generally, roadway simulators improve the realism of flow characteristics leading to improved measurement of aerodynamic characteristics.

The vehicle is typically restrained with respect to the simulated roadways through a linkage that restrains the vehicle from movement in longitudinal direction (fore and aft), in lateral direction (side-to-side) and in yaw (steering motion). Commonly, the vehicle restraints are passive restraints which do not affect the vehicle's dynamics, but which can be used for measuring loads if desired in the different directions of restraint. The vehicle is maintained for free movement in roll, pitch and vertical directions, and if desired, force inputs for roll, pitch and aerodynamic forces in the vertical direction can be added into the test vehicle to simulate the effect of increased speed, cornering or the like on the vehicle.

SUMMARY

A roadway system for a vehicle and a method for testing a vehicle on a roadway system are provided. The roadway system and/or method include a platform having at least one movable endless belt configured to support a vehicle. A sensor assembly is configured to provide an output signal indicative of position, displacement, velocity and/or acceleration of the vehicle on the belt with respect to at least one reference axis. An autopilot system is configured to operate a component of the vehicle to control the vehicle on the belt with respect to the reference axis based on the output signal.

In a first embodiment of the roadway system and/or method, the sensor assembly is arranged to sense a lateral position, displacement, velocity and/or acceleration of the vehicle across the belt in a direction orthogonal to a direction of motion of the belt proximate the vehicle, the autopilot system is configured to control steering of the vehicle.

In yet another embodiment, the roadway system and/or method is arranged to sense a longitudinal position, displacement, velocity and/or acceleration of the vehicle along the belt in a direction of motion of the belt proximate the vehicle. The autopilot system is configured to control speed of the vehicle. This embodiment can also include sensing and steering of the vehicle as described above, if desired.

In yet a further embodiment, a fan is configured to blow air over the endless belt and wherein the platform is movable so as to selectively orient the endless belt relative to the fan to simulate at least a partial cross-wind while the vehicle is moving on the belt. The platform can be rotated while the air is blowing and/or the belt is moving, if desired.

In another embodiment, the roadway system and/or method include a restraint coupled to the vehicle. The restraint can be configured to restrain the vehicle in a direction of motion of the belt and/or in a direction of motion orthogonal to the motion of the belt. The restraint(s) can be continually active in the direction of restraint or be active only upon exceeding a selected parameter such as acceleration, velocity and/or displacement.

DETAILED DESCRIPTION OF THE ILLUSTRATIVE EMBODIMENTS

Figure 1:
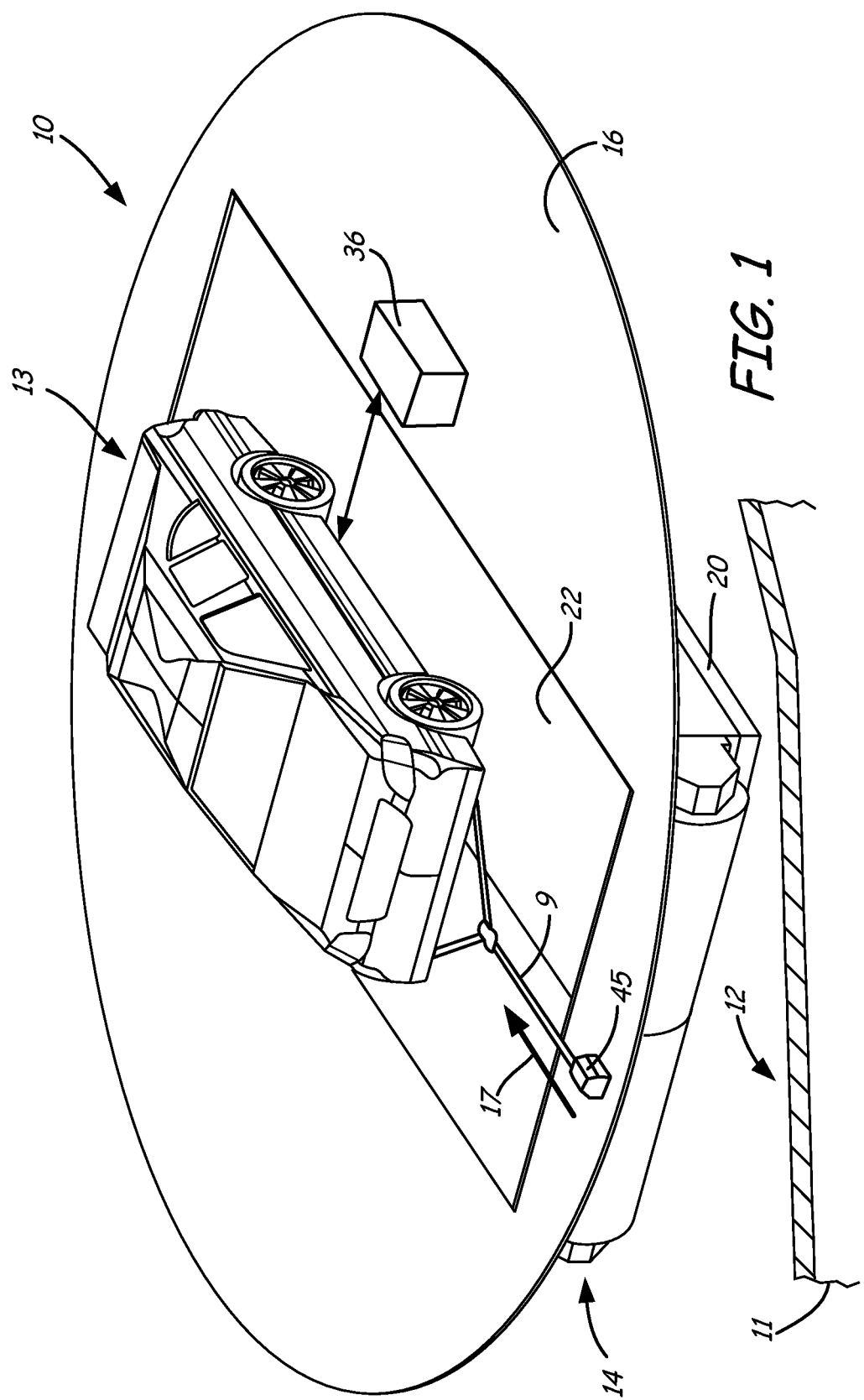
FIG. 1 is a perspective view of an exemplary embodiment of a vehicle test facility having one or more aspects of the present invention.

Referring to FIG. 1, a vehicle restraint 9 and simulation system 10 having one or more aspects of the invention is illustrated. In the embodiment illustrated, a vehicle 13 is an automobile; however, it should be understood that this is but one example of a vehicle and that other vehicles such as but not limited to motorcycles, trucks, etc. can benefit from aspects of the present invention.

In the embodiment illustrated, the system 10 includes a support base 11, which generally comprises a large concrete structure having a pit indicated generally at 12 in which the main roadway mechanisms 14 are mounted so that the vehicle 13 to be tested is at about the level of the surface surrounding the pit 12. In many instances, the system 10 forms part of a wind tunnel having a fan, not shown, but represented by arrow 17. The vehicle 13 and the main roadway mechanism 14 can include a platform 16, which, in the embodiment illustrated, is a turntable that allows the vehicle 13 to be positioned selectively with respect to the air flow generated by the fan.

The platform 16 and the main roadway mechanisms 14, although not necessary, can be mounted on a balance assembly, schematically illustrated at 20, which can measure various forces upon the vehicle 13. Such balance assemblies, which can take many forms, are well known in the art and need not be further discussed for purposes of the present application. However, one suitable balance assembly is described in United States Published Patent Application 2007/0039400, which is hereby incorporated by reference in its entirety. Alternatively, through the belt measurements can be taken to obtain various force measurements as is known in the art.

It should also be noted that the roadway mechanism 14 herein illustrated includes a single endless belt 22 upon which the vehicle 13 is supported. As appreciated by those skilled in the art, aspects of the present invention can be applied to roadway mechanisms that comprise two or more belts used to support the vehicle 13 and/or are positioned under various portions or proximate to panels of the vehicle 13. All of the belts, if more than one is present, are driven by suitable motors and rollers, the details of which are well known, and not necessary for understanding aspects of the present invention.

Referring now to the vehicle restraint 9, in one form, the vehicle restraint 9 restrains the vehicle in a longitudinal direction (the direction of movement of the belt 22 proximate the vehicle 13), providing little, if any, restraint in a lateral direction (across the belt 22) or restraint in a yaw moment (steering direction). For purposes of reference, the longitudinal direction, the lateral direction comprises two axes of a set of three orthogonal axes, where a vertical direction is orthogonal to both the longitudinal and lateral directions. Roll, pitch and yaw comprise pivoting motions about the longitudinal, lateral and vertical directions (axes), respectively.

In the illustrated embodiment, the restraint 9 comprises a cable 24 attached to the vehicle 13 at one end and to stationary structure (relative to the moving belt) such as a stationary object in the test facility, for example, to platform 16, if present. Although exemplified herein as a cable, it should be understood that vehicle restraint 9 can take many different forms, such as a rigid tow bar, which could then provide restraint for both forward and rearward movement of the vehicle 13, whereas the cable 9 retrains movement of the vehicle only rearwardly. It should also be understood that vehicle restraint 9 need not only be attached to the front portion of the vehicle 13, but rather, can be attached to the vehicle 13 at other locations as well as to other portions of the test facility so long as, in this embodiment, longitudinal restraint is provided, with little if any restraint in the remaining degrees of freedom, at least for some lateral movements of the vehicle 13 on the belt 22. Lateral restraints can be included if it is desired selectively to provide such restraint. For example, suitable mechanisms (cables, links, struts, etc.) can be present to ensure that the vehicle 13 stays on the belt 22, and thus, for example, come into effect only when limits or thresholds of movement have been exceeded. These types of restraints can also take the form of cables and/or struts 48 (illustrated in FIG. 5).

Figure 2:
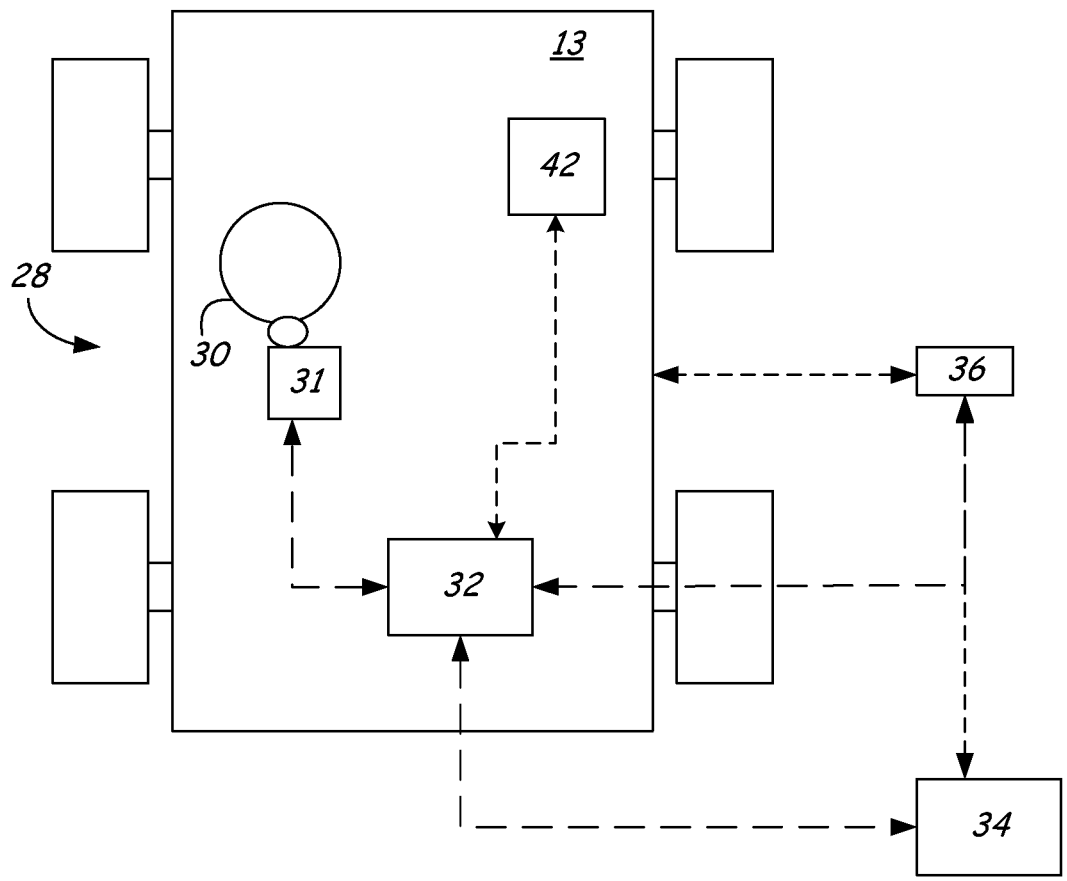
FIG. 2 is schematic representation of a first embodiment of an autopilot system having one or more aspects of the present invention.

Referring also to FIG. 2, in this embodiment, in addition to vehicle restraint 9, the vehicle 13 is equipped with remote steering system 28 operably coupled to the steering system (schematically represented by steering wheel 30) of the vehicle 13 so as to steer the vehicle while it rolls on belt 22. The remote steering system 28 is in effect an autopilot system that performs a single function that being steering the vehicle 13. Suppliers of such systems include Stahle Gmbh of Neuhausen-Steinegg, Germany and Anthony Best Dynamics Ltd. of Wiltshire England. In one example as illustrated, the remote steering system 28 is operably coupled to the steering wheel 30 of the vehicle 13; however, this should not be considered limiting in that the remote steering system 28 can be coupled to other components of the vehicle's steering system such as the steering shaft or other links commonly found in vehicle steering systems. When coupled to a component of the vehicle steering system, the remote steering system 28 comprises a suitable actuator 31 (electric, pneumatic and/or hydraulic), for example, rotary actuator, that in turn is operated under the direction of a controller 32. The controller 32 can include a wireless receiver or transceiver that allows communication with a test facility controller 34. Alternatively, the controller 32 can be connected to the test facility controller 34 with a suitable wired or direct connection. It should be noted that the controllers 32 and 34 can be constructed with analog and/or digital circuitry with models, control algorithms and other operating processes discussed below configured in hardware and/or software as is known in the art.

At this point it should be noted the remote steering system 28 need not always include an additional actuator to operate the steering system of the vehicle 13. For instance, some vehicles now or in the foreseeable future do not have a direct linkage connection between the steering wheel 30 and the components used to turn the tire and wheel assemblies. Instead, an onboard controller 42 is operably coupled to a sensor that senses the position of the steering wheel 30 and then, in turn, provides an output control signal for an actuator (provided on the vehicle by the manufacturer) to perform steering. In such cases, the controller 32 would be configured to provide an output signal that is an input to the onboard controller 42 in place of the sensor that senses the position of the steering wheel.

A sensor 36 (shown schematically) is operably coupled to the vehicle 13 to measure and provide an output signal indicative of lateral displacement and/or position of the vehicle 13 on the belt 22. The sensor output signal can be provided to the controller 32 and/or the test facility controller 34. The sensor 36 can take numerous forms as appreciated by those skilled in the art. In one exemplary embodiment, the sensor 36 is an optical sensor that measures a distance between a portion of the vehicle 13 and the platform 16. Other forms of mechanically, optically and/or electrically based sensors can be used. If desired, additional sensors can be provided to provide additional measurements such as longitudinal, vertical displacements and/or motions of roll, yaw and pitch of the vehicle, the measurements of which can also be used to provide indications of velocity or acceleration. Any of the foregoing measurements can be measured, if desired, with respect to the vehicle 13 directly and/or with respect to components of restraint system 9, or other restraint systems that may be employed.

If desired, forces on the vehicle or components thereof can also be measured. For instance a longitudinal force experienced by the vehicle 13 can be measured via restraint system 9 with a sensor 45, while additional forces, moments or other characteristics of loading such as but not limited to frequency of vibrations can be measured with, for example, the balance assembly mentioned above.

Other forces, moments or other characteristics of loading such as but not limited to frequency of vibrations are those experienced by the driver, for example, through the steering wheel 30, which were previously not measured in wind tunnel facilities, but can be very useful in vehicle design. In one embodiment, the remote steering system 28 includes suitable sensors that are operably coupled to the steering wheel 30 (for example, being incorporated in actuator 31) for measuring and providing output(s) indicative of forces, moments or other characteristics of loading. The remote steering system 28 can be configured so as to simulate an actual driver. For example, actuator stiffness can be adjusted to simulate a driver. Likewise, other forces, moments or other characteristics of loading upon the vehicle 13 or components thereof such as but not limited to frequency of vibrations can be sensed by sensors, either those provided by the vehicle manufacturer, for example, those provided for onboard stability control systems, or such sensors can be added to the vehicle 13 where desired, including sensor(s) provided in anatomical dummy(s) to measure driver and/or passenger sensations. Output(s) from the sensor(s) can be provided to the controller 32 and/or the test facility controller 34 for recordation and/or as feedback inputs for control of the vehicle 13.

In operation, the roadway belt 22 is driven while wind is directed at the vehicle 13. The remote steering system 28 is operated based on desired testing to be performed. Operation can be based on the remote steering system 28 simply maintaining a desired position of the vehicle 13 on the belt 22, while any of the foregoing measurements or other measurements are observed, for example, for changes in speed or other characteristics of the wind being directed at the vehicle 13, and/or positioning of the vehicle 13 with respect to the wind such as by rotation of the platform 16. However, with the remote steering system 28 now being employed, the steering system of the vehicle 13 can be operated per testing procedures not previously available. For instance, it is common that air vortices can be shed from the vehicle under normal operation, and in particular, when the vehicle is operated in a cross-wind. Such vortex shedding can impart forces on the vehicle or components thereof some of which may be experienced by driver. In particular, such vortices can be simulated in the wind tunnel including with cross-winds simulated with rotation of the vehicle 13 to the airflow 17 via the turntable 16 to a selected position where the airflow and the movement of the belt under the vehicle 13 are non-parallel. Turntable movement can be performed while the air is blowing and/or the belt is moving. In prior art wind tunnels, the vehicle restraints inhibit measurements of such forces and displacements. However, using the above-described sensors qualitative and/or quantitative data can be obtained for forces and/or displacements experienced by the driver and/or other portions of the vehicle.

In yet another example, the controller 32 and/or test facility controller 34 can operate the remote steering system 28 per a prescribed or selected test procedure that can be accurately repeated for changes in the vehicle 13 or other operating conditions. Furthermore, the controller 32 and/or test facility controller 34 can employ models and/or control algorithms known in the art to simulate human driver responses or actions such as but not limited to driver response delays or over-corrections. It should be noted these test operations upon the vehicle 13 can be performed on any of the embodiments herein described, as applicable, and are not limited to the embodiment of FIG. 1.

Figure 3:
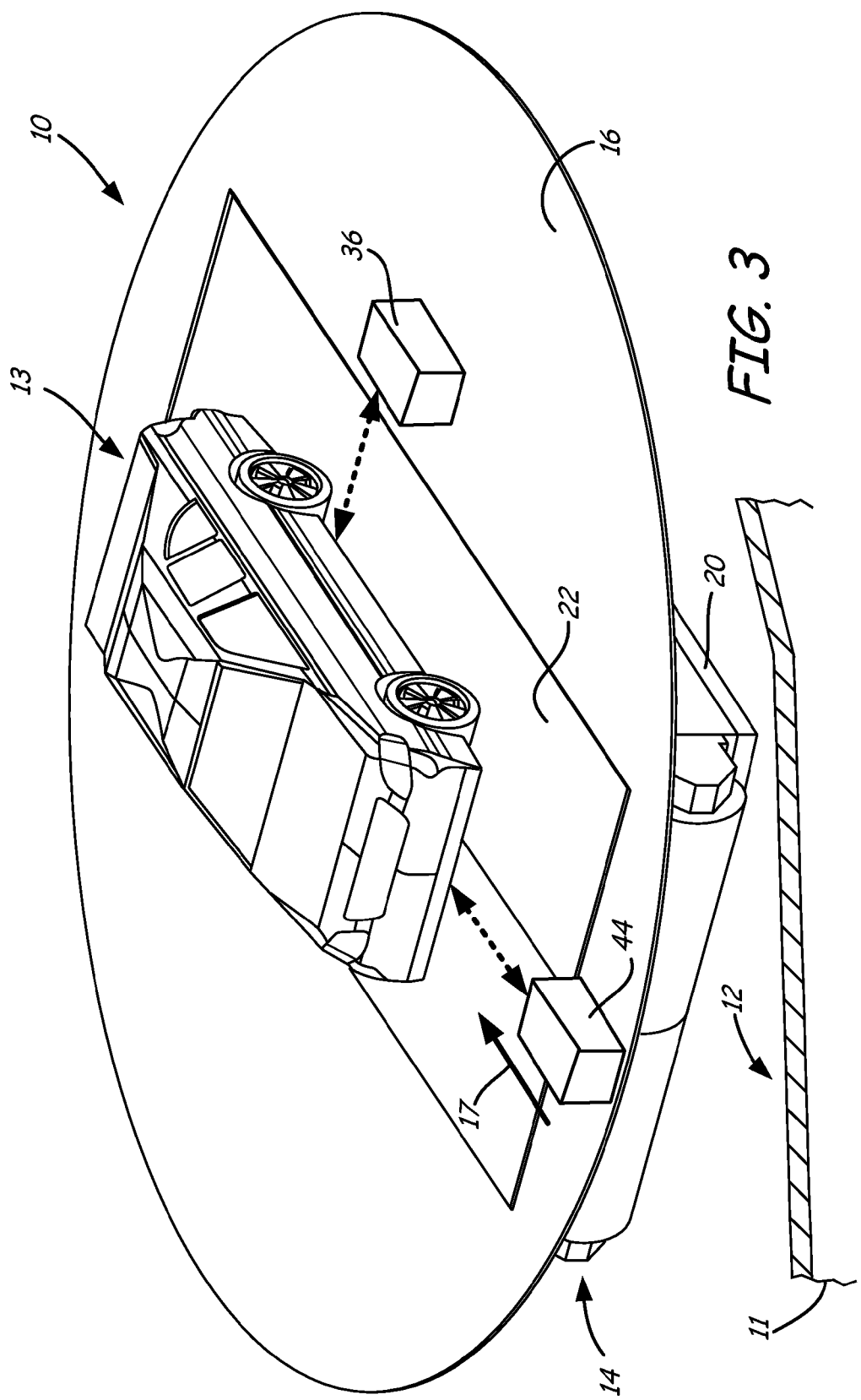
FIG. 3 is a perspective view of a second exemplary embodiment of a vehicle test facility having one or more aspects of the present invention.

FIG. 3 illustrates a second embodiment of a vehicle test facility having one or more aspects of the present invention. In this embodiment, the autopilot system includes those components or optional components for performing remote steering of the vehicle 13; however, vehicle restraint 9 is not used to maintain the position of the longitudinal position of the vehicle 13 on the belt 22. Instead, the autopilot system also includes remote speed control 40 system that is used to control driving and/or braking of the wheel(s) of the vehicle 13. In other words, the remote speed control system 40 is used to maintain the longitudinal position of the vehicle 13 on the belt 22 during testing.

Figure 4:
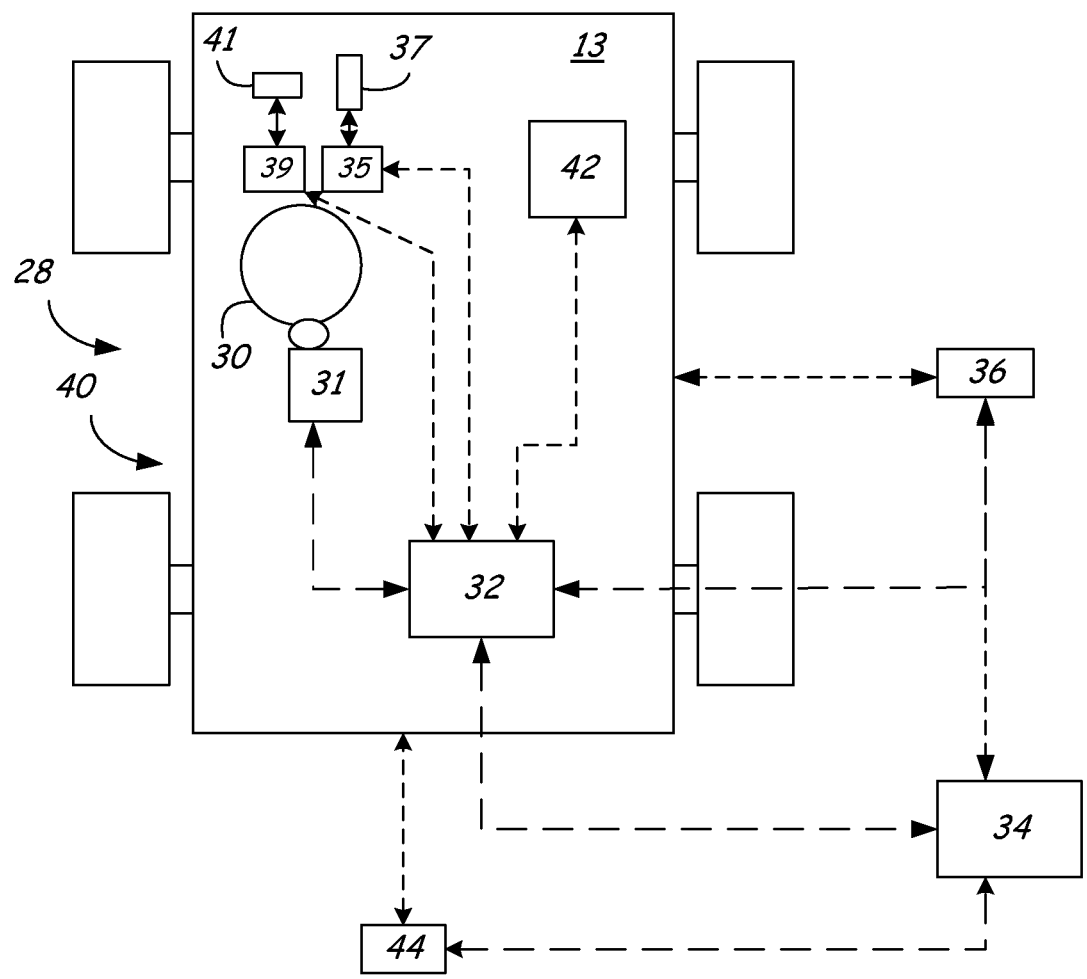
FIG. 4 is schematic representation of a second embodiment of an autopilot system having one or more aspects of the present invention.

Referring to the schematic illustration of FIG. 4, similar to the remote steering system 28, the remote speed control system 40 includes controller 32 that can provide control signals to actuators operably coupled component(s) that operate the engine of the vehicle, or otherwise drive the vehicle such as electric motors in electric or hybrid vehicles. For instance, a first actuator 35 can be operably coupled to the gas pedal 37, while a second actuator 39, if desired, can be operably coupled to the brake pedal 41. If one or both of these pedals is not directly connected to operate, the engine, motor and/or brake system, but rather, sensor(s) are provided by the manufacturer to sense operation of the pedals, the remote speed control system 40 can provide suitable inputs to the onboard controller 42 of the vehicle 13.

A sensor 44 (shown schematically) is operably coupled to the vehicle 13 to measure and provide an output signal indicative of longitudinal displacement and/or position of the vehicle 13 on the belt 22. The sensor output signal can be provided to the controller 32 and/or the test facility controller 34. The sensor 44 can take numerous forms as appreciated by those skilled in the art. In one exemplary embodiment, the sensor 44 is an optical sensor that measures a distance between a portion of the vehicle 13 and the platform 16. Other forms of mechanically, optically and/or electrically based sensors can be used. It should be noted, two sensors 36 and 44 are illustrated; however, this schematic illustration is for purpose of understanding and should not be considered limiting in that a single sensor or sensor assembly that senses in two or more directions can also be used in this or any of the exemplary embodiments herein described.

Furthermore, it should be understood that any of the foregoing sensor or sensor assemblies can provide outputs indicative of position, displacement, velocity and/or acceleration of the vehicle on belt 22 and, using any form of such outputs, the autopilot systems herein described can be used to control components of the vehicle 13 on the belt to according to the desired position, displacement, velocity and/or acceleration of the vehicle on belt 22.

Although no longitudinal restraint is provided in this embodiment to actively control the longitudinal position of the vehicle 13 on the belt 22, restraints can be included if it is desired selectively to provide such restraint. For example, suitable mechanisms (cables, links, struts, etc.) can be present to ensure that the vehicle 13 stays on the belt 22, and thus, for example, come into effect only when limits or thresholds of movement have been exceeded.

In operation, the roadway belt 22 is driven while wind directed at the vehicle 13. The autopilot system (comprising the remote speed control system 40 and remote steering system 28) is operated based on desired testing to be performed. Operation can be based on the autopilot system 28 simply maintaining a desired position of the vehicle 13 on the belt 22, while any of the foregoing measurements or other measurements are observed, for example, for changes in speed or other characteristics of the wind being directed at the vehicle 13, and/or positioning of the vehicle 13 with respect to the wind such as by rotation of the platform 16. However, with the autopilot system now being employed, the speed and steering system of the vehicle 13 can be operated per testing procedures not previously available. For instance, the controller 32 and/or test facility controller 34 can operate the autopilot system per a prescribed or selected test procedure that can be accurately repeated for changes in the vehicle or operating conditions. Furthermore, the controller 32 and/or test facility controller 34 can employ models and/or control algorithms known in the art to simulate human driver responses or actions such as but not limited to driver response delays or over-corrections.

In yet a further embodiment, the autopilot system can comprise the speed control system 40 and not the remote steering system 28. As described above, sensor 44 provides a signal indicative of longitudinal displacement or position to controller 32 and/or test facility controller 34. In this embodiment, a vehicle restraint system 46 provides lateral restraint.

Figure 5:
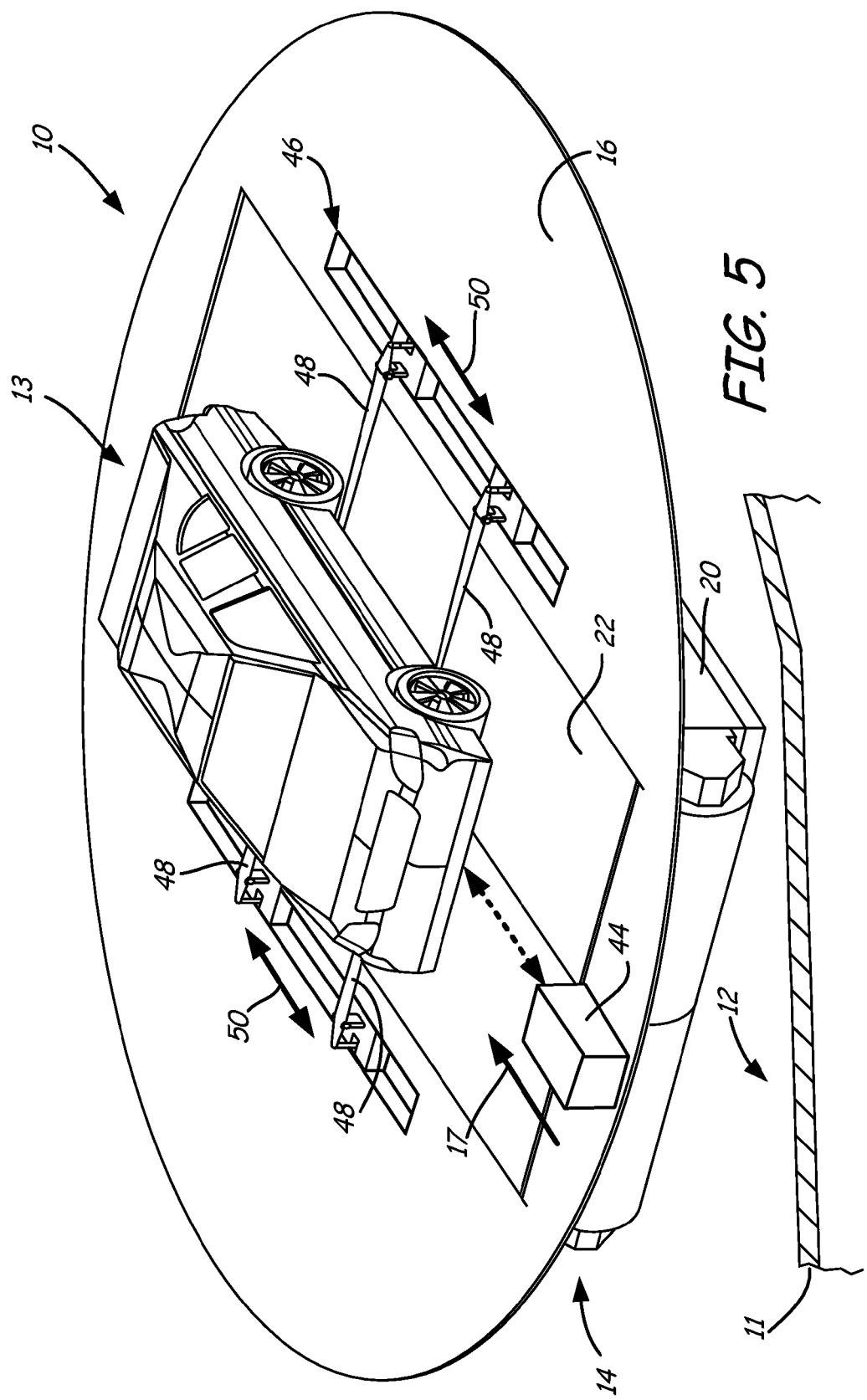
FIG. 5 is a perspective view of a second exemplary embodiment of a vehicle test facility having one or more aspects of the present invention.

In the exemplary embodiment illustrated in FIG. 5, vehicle restraint system 46 includes one or more struts 48 that restrain the vehicle 13 laterally on belt 22, but allow longitudinal motion of the vehicle. For example, the one or more struts 48 can be coupled to the platform 16 for limited longitudinal motion as indicated by double arrow 50. As appreciated by those skilled in the art other forms of restraint using cables and/or struts can also be used. Such restraints can be passive such as that described above or include actively controlled components such as motors or actuators to provide lateral restraint and longitudinal compliance.

Although the present invention has been described with reference to preferred embodiments, workers skilled in the art will recognize that changes may be made in form and detail without departing from the spirit and scope of the invention. For instance, although the foregoing embodiments each included two separate supports on each side of the vehicle, this should not be considered limiting. In further embodiments one or more supports can be provided on each side of the vehicle. In addition, each support may connect to one or more points on the vehicle.

What is claimed is:

1. A roadway system for a vehicle, comprising:
    a platform having at least one movable endless belt configured to engage a tire and wheel assembly and support a vehicle;
    a sensor assembly configured to provide an output signal indicative of position, displacement, velocity and/or acceleration of the vehicle on the belt with respect to at least one reference axis; and
    an autopilot system configured to operate a steering component of a steering system of the vehicle that controls steering of the tire and wheel assembly of the vehicle or configured to operate a speed component of a speed control system of the vehicle that controls a rotational speed of the tire and wheel assembly of the vehicle.

2. The roadway system of claim 1 wherein the sensor assembly is arranged to sense a lateral position, displacement, velocity and/or acceleration of the vehicle across the belt in a direction orthogonal to a direction of motion of the belt proximate the vehicle.

3. The roadway system of claim 2 wherein the autopilot system comprises an actuator on the vehicle configured to control the steering component of the steering system of the vehicle.

4. The roadway system of claim 3 and further comprising a restraint coupled to the vehicle and the platform to restrain the vehicle in a direction of motion of the belt.

5. The roadway system of claim 4 and further comprising a lateral restraint coupled to the vehicle and the platform to selectively restrain the vehicle laterally on the belt in a direction of motion orthogonal to the motion of the belt when selected displacement of the vehicle laterally on the belt has been exceeded.

6. The roadway system of claim 1 wherein the sensor assembly is arranged to sense a longitudinal position, displacement, velocity and/or acceleration of the vehicle along the belt in a direction of motion of the belt proximate the vehicle.

7. The roadway system of claim 6 wherein the autopilot system comprises an actuator on the vehicle configured to control the speed component of the speed control system of the vehicle.

8. The roadway system of claim 7 wherein the sensor assembly is arranged to sense a lateral position, displacement, velocity and/or acceleration of the vehicle across the belt in a direction orthogonal to a direction of motion of the belt proximate the vehicle.

9. The roadway system of claim 8 wherein the autopilot system is configured to control steering of the vehicle.

10. The roadway system of claim 9 and further comprising a restraint coupled to the vehicle and the platform to restrain the vehicle in a direction of motion on the belt.

11. The roadway system of claim 10 wherein the restraint comprises a lateral restraint coupled to the vehicle and the platform to selectively restrain the vehicle laterally on the belt in a direction of motion orthogonal to the motion of the belt when selected displacement of the vehicle laterally on the belt has been exceeded.

12. The roadway system of claim 7 wherein the autopilot system comprises an autopilot controller to provide an output signal to control the speed component of the speed control system of the vehicle.

13. The roadway system of claim 12 wherein the speed component of the vehicle comprises a controller.

14. The roadway system of claim 1 and further comprising a fan configured to blow air over the endless belt and wherein the platform is movable so as to selectively orient the endless belt relative to the fan.

15. The roadway system of claim 1 and further comprising a sensor on the vehicle configured to measure forces, moments or other characteristics of loading on the vehicle experienced by a passenger of the vehicle.

16. The roadway system of claim 15 wherein the sensor is configured to measure forces, moments or other characteristics of loading on the steering wheel of the vehicle.

17. The roadway system of claim 2 wherein the autopilot system comprises an autopilot controller to provide an output signal to control the steering component of the steering system of the vehicle.

18. The roadway system of claim 17 wherein the steering component of the vehicle comprises a controller.

19. A method for testing a vehicle in a wind tunnel having a movable endless belt, the method comprising:
    rotating the endless belt with the vehicle present;
    sensing position, displacement, velocity and/or acceleration of the vehicle on the belt with respect to at least one reference axis and providing an output signal in accordance therewith;
    receiving the output signal as an input in an autopilot system; and
    operating a component of the vehicle based on the output signal to control the vehicle on the belt, wherein operating comprises at least one of operating a steering system of the vehicle to obtain a desired lateral position of the vehicle on the endless belt without lateral restraint provided to the vehicle to restrain the vehicle in the desired lateral position with respect to the reference axis or operating a speed control system of the vehicle to obtain a desired longitudinal position of the vehicle on the endless belt without longitudinal restraint provided to the vehicle to restrain the vehicle in the desired longitudinal position.

20. The method of claim 19 wherein sensing includes sensing a lateral position, displacement, velocity and/or acceleration of the vehicle across the belt in a direction orthogonal to a direction of motion of the belt proximate the vehicle.

21. The method of claim 20 wherein operating includes steering the vehicle.

22. The method of claim 21 wherein operating the steering system comprises operating an actuator coupled to a component of the steering system.

23. The method of claim 19 wherein sensing includes sensing a longitudinal position, displacement, velocity and/or acceleration of the vehicle along the belt in a direction of motion of the belt proximate the vehicle.

24. The method of claim 23 wherein operating includes controlling speed of the vehicle.

25. The method of claim 24 wherein sensing includes sensing a lateral position, displacement, velocity and/or acceleration of the vehicle across the belt in a direction orthogonal to a direction of motion of the belt proximate the vehicle.

26. The method of claim 25 wherein operating includes steering the vehicle.

27. The method of claim 24 wherein operating the speed control system comprises operating an actuator coupled to a component of the speed control system.

28. The method of claim 27 wherein operating the actuator comprises providing an input signal to a controller of the vehicle that controls operation of the actuator.

29. The method of claim 19 and further comprising selectively orienting the endless belt and the vehicle relative to air from a fan; and blowing air over the vehicle and the endless belt when movement of the air and a portion of belt under the vehicle are non-parallel.

30. The method of claim 11 and providing a sensor on the vehicle and measuring forces, moments or other characteristics of loading on the vehicle experienced by a passenger of the vehicle.

31. The method of claim 11 wherein measuring comprises measuring forces, moments or other characteristics related to steering the vehicle.

32. The method of claim 22 wherein operating the actuator comprises providing an input signal to a controller of the vehicle that controls operation of the actuator.

33. A roadway system for a vehicle, comprising:
a platform having at least one movable endless belt configured to support a vehicle;
a sensor assembly configured to provide an output signal indicative of position, displacement, velocity and/or acceleration of the vehicle on the belt with respect to at least one reference axis; and
an autopilot system configured to operate based on the output signal of at least one of operating a steering system of the vehicle to obtain a desired lateral position of the vehicle on the endless belt without lateral restraint provided to the vehicle to restrain the vehicle in the desired lateral position with respect to the reference axis or a speed control system of the vehicle to obtain a desired longitudinal position of the vehicle on the endless belt without longitudinal restraint provided to the vehicle to restrain the vehicle in the desired longitudinal position.

* * * * *